Jan. 2, 1951     H. JAGGER     2,536,605
RECIPROCATING SHEET HANDLING DEVICE FOR
FLAT-BED DUPLICATING MACHINES Filed Aug. 31, 1945     9 Sheets-Sheet 1

Fig.1.

INVENTOR.
Hubert Jagger
BY
Sheridan Davis & Cargill
Attys

Jan. 2, 1951

H. JAGGER 2,536,605

RECIPROCATING SHEET HANDLING DEVICE FOR
FLAT-BED DUPLICATING MACHINES

Filed Aug. 31, 1945

INVENTOR.
Hubert Jagger
BY
Sheridan Davis and Cargill
Attys

Jan. 2, 1951    H. JAGGER    2,536,605
RECIPROCATING SHEET HANDLING DEVICE FOR
FLAT-BED DUPLICATING MACHINES
Filed Aug. 31, 1945    9 Sheets-Sheet 9

INVENTOR.
Hubert Jagger
BY Sheridan Davis & Cargill
Attys

Patented Jan. 2, 1951

2,536,605

UNITED STATES PATENT OFFICE 2,536,605

RECIPROCATING SHEET HANDLING DEVICE FOR FLAT-BED DUPLICATING MACHINES

Hubert Jagger, Maywood, Ill.

Application August 31, 1945, Serial No. 613,726

7 Claims. (Cl. 101—133)

This invention relates to improvements in duplicating machines.

One object of the invention is to provide a duplicating machine of the flat bed type having improved means for operating the machine.

Another object of the invention is to provide a duplicating machine having a flat bed across which a sheet-laying and stripping mechanism is reciprocable and provided with a novel type of operable actuating mechanism therefor.

A further object of the invention is to provide a flat bed duplicator with a reciprocable sheet-handling device which may be manually or power operated in one direction, and which is automatically operable in the reverse direction.

Other objects of the invention relate to various features of construction and arrangement of parts which will be apparent from a consideration of the following specifications and accompanying drawings wherein:

The duplicating machine shown in Figs. 1 to 10, inclusive, of the drawings, is of the flat bed type, which normally employs a gelatine band and is designed for operation during the duplicating or working stroke of the machine, either by the hand of the operator or by a conveniently located foot pedal, both modes of operation being considered as manual operation.

Figure 1:
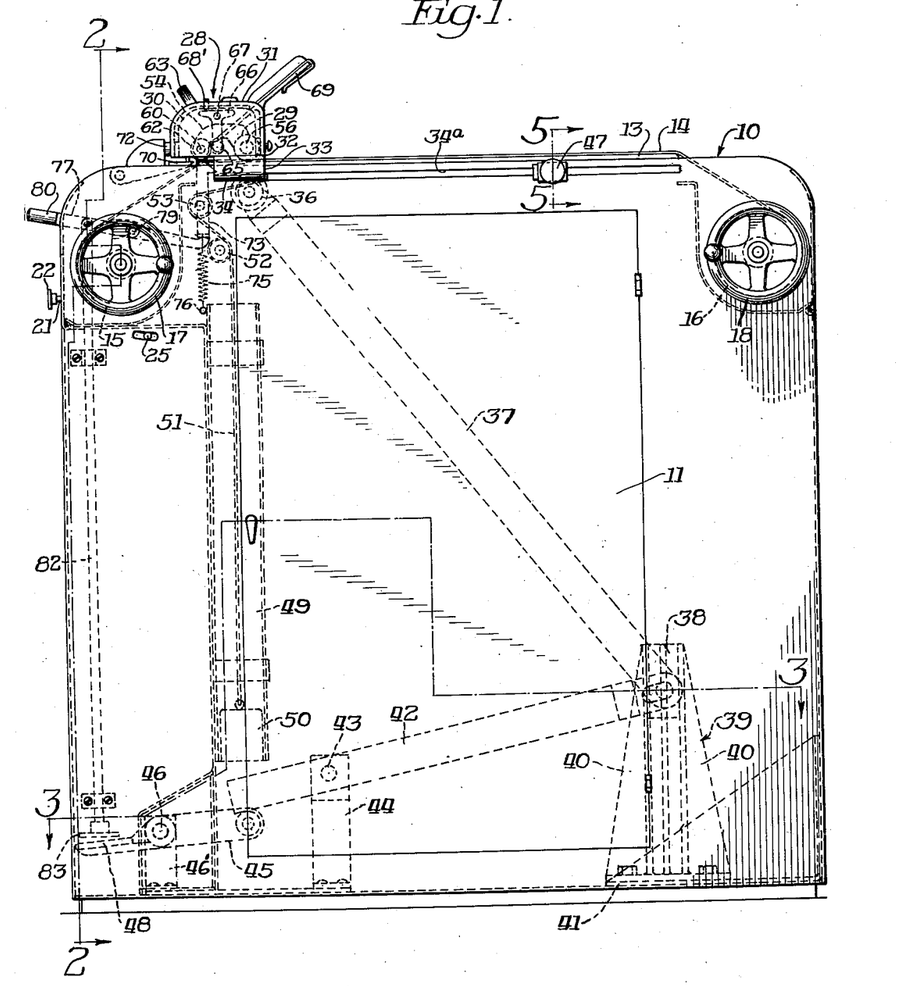
Fig. 1 is a side elevation of a duplicating machine that is illustrative of the present improvements.

Referring to Fig. 1, numeral 10 indicates generally a suitable casing for the machine, within which, for the most part, the operating structure of the mechanism is housed.

Figure 4:
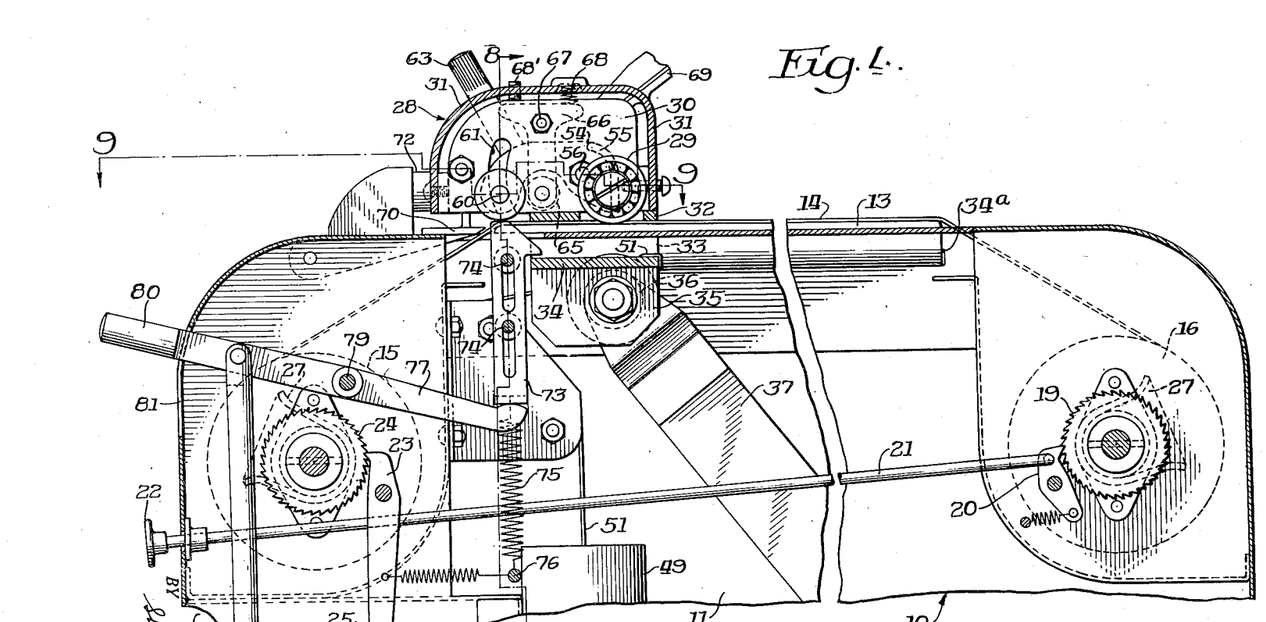
Fig. 4 is a broken vertical sectional view taken on line 4—4 of Fig. 2.
Figure 5:
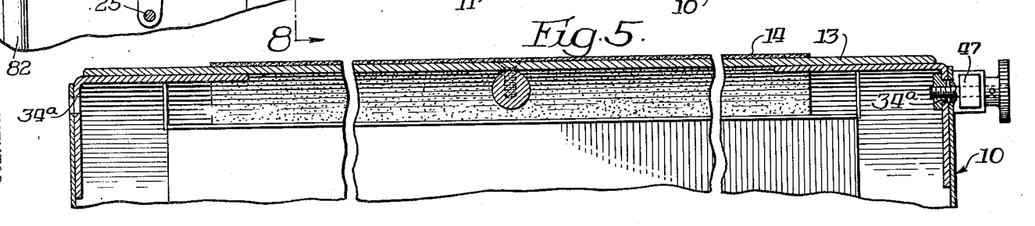
Fig. 5 is a broken sectional view taken on line 5—5 of Fig. 1.

As shown in Fig. 1, the casing is provided with a door 11, providing access to the interior for adjustment or repair of parts, or for other servicing. The height of the casing is such as to afford convenience in operation by an operator standing or sitting at the left hand side of the machine, as viewed in Fig. 1. The top surface of the casing is provided with a bed plate 13, over which is adapted to be disposed a portion of a duplicating band 14, as of the gelatine type, and having end portions which are carried by spools or drums 15 and 16, the former at the forward side of the machine, and the latter at the rear side, as indicated in Fig. 4.

When the portion of the band 14, which overlies the bed 13 has been used and it is desired to duplicate the copyable matter on a second master sheet, the band is advanced forwardly or rearwardly to move a fresh section of the band in position upon the bed for receiving the transferable material from the second master. The rotation of drums 15 or 16 is accomplished by means of hand wheels 17 and 18, respectively, shown in Fig. 1. Normally, the drums are latched against operation, and, hence, against displacement of the exposed band portion that rests upon the bed 13. When it is desired to advance the band toward the front of the machine, the hand wheel 17 is operable in a counter-clockwise direction, as viewed in Fig. 1, which winds the band upon the drum, the band being paid out by the other drum 16. The drum 16 carries a ratchet wheel 19, a tooth of which normally is engaged by a spring-pressed pawl 20, and, hence, when the band is being advanced, as above described, the pawl 20 is manually retracted from engagement with the teeth of the ratchet 19 by means of a rod 21, which is provided with a convenient knob or fingerpiece 22 accessible at the front of the machine.

Figure 2:
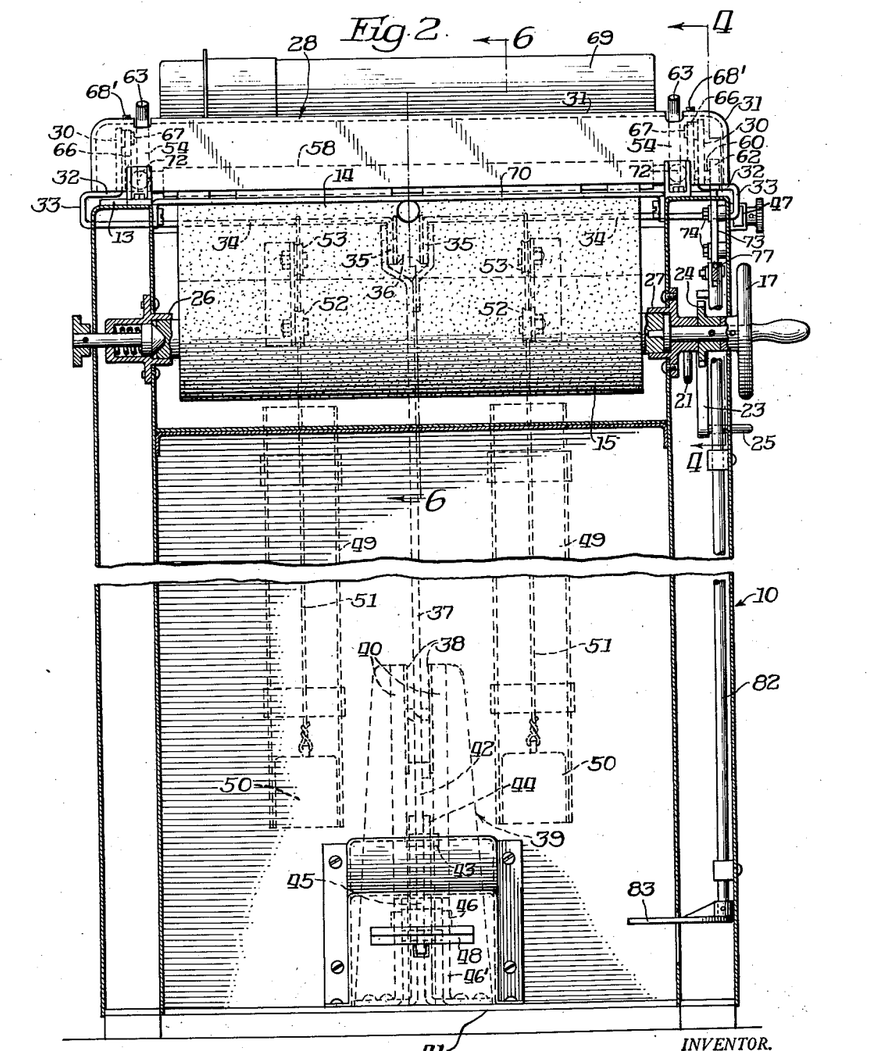
Fig. 2 is a vertical sectional view taken on line 2—2 of Fig. 1.
Figure 3:
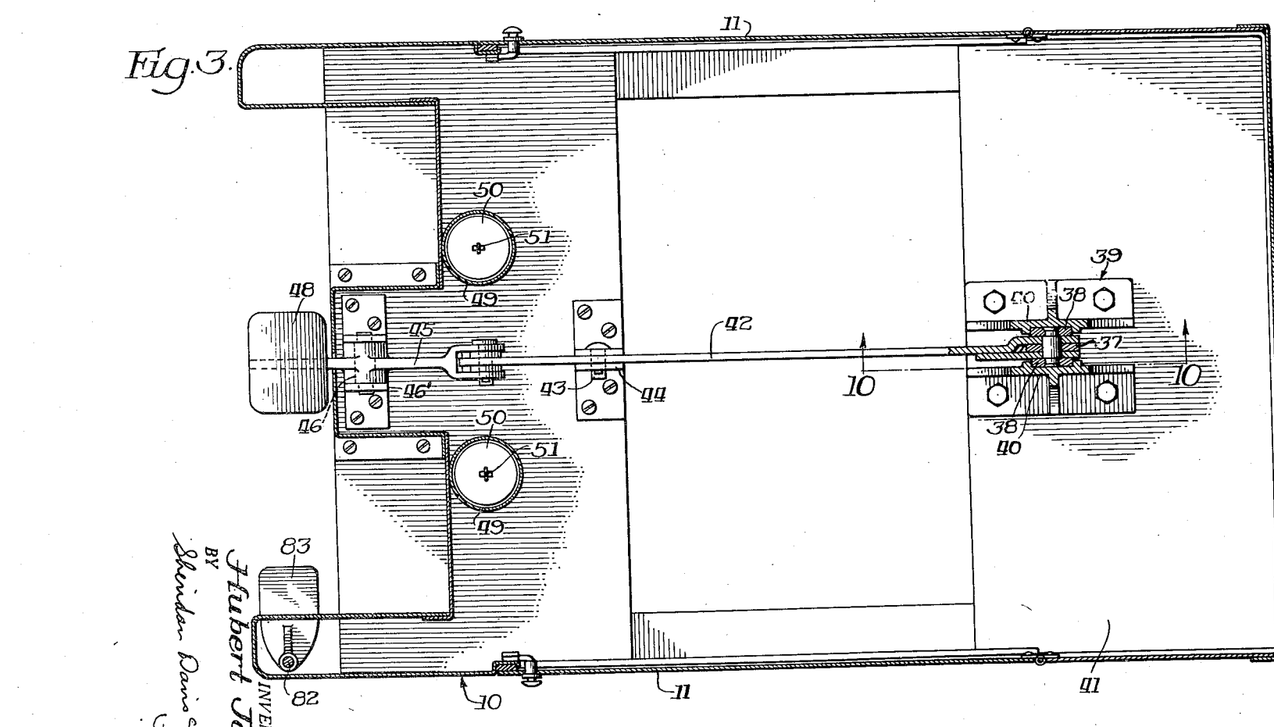
Fig. 3 is a horizontal sectional view taken on line 3—3 of Fig. 1.

When it is desired to advance the band toward the rear of the machine, the handwheel 18 is operated in a clockwise direction, in which instance the pawl 20 slides over the teeth of ratchet 19, while a pawl 23, which normally is in engagement with the teeth of ratchet 24, carried by the drum 15, is held manually in inoperative position by swinging forwardly a convenient fingerpiece 25 (see Fig. 1), which is shown as carried by the pawl 23. The knob 25 is accessible at the right hand side of the machine, as shown in Fig. 2.

The provision of pawls 20 and 23 enables the operator to tighten the band 14 adequately across the bed 13, after moving a fresh section of the band into operative position upon the bed. The drums 15 and 16 are mounted for support in convenient brackets 26 and 27, as illustrated in Fig. 2, the brackets being such as to facilitate removal of the band rolls when desired.

Figure 10:
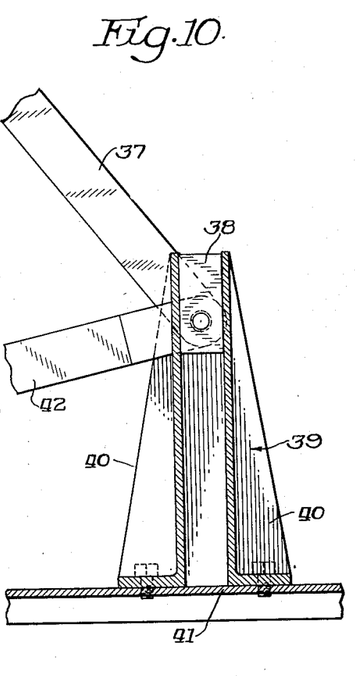
Fig. 10 is a broken vertical sectional view taken on line 10—10 of Fig. 3.

A carriage, indicated generally by the numeral 28, is arranged for reciprocating movement longitudinally of the bed 13 and is adapted to apply to the duplicator band 14 the copy sheets that are successively inserted in the carriage. The carriage is provided with a pair of anti-friction rollers 29 (see Fig. 9), adapted to travel upon the lateral edges of bed 13, the rollers being secured to brackets 30, which are secured to the carriage casing 31. The brackets 30 are provided with lateral extensions 32, which extend beyond the adjacent margins or longitudinal edges of the bed 13, which extensions extend downwardly to form portions 33 (see Fig. 2) and thence inwardly, providing portions 34, which latter portions terminate in downward flanges 35, which are journalled upon bearing member 36, carried by the upper end of an actuating lever 37. The actuating lever 37, at its lower end, is journalled to a reciprocating head 38, which is arranged for vertical sliding movement within a guide, indicated generally by the numeral 39, and formed of a pair of pedestal-like guide members 40, which are secured upon the base 41 of the casing, as indicated in Figs. 1 and 10.

The members 40 are provided with channels which cooperate to receive the head 38, and are spaced apart sufficiently to accommodate therebetween the arm 37 as well as a lever 42, which, as shown in Fig. 1, is pivotally mounted at 43 on a support 44. The left-hand end of the lever, as shown in Fig. 1, extends over the right-hand end of a foot-operable lever 45, which is pivotally mounted at 46 to a support 46', and which carries a pedal, or other foot-actuating device 48, at its outer end. Downward pressure at the pedal 48, as by the operator's foot, causes the lever 42 to move clockwise about the pivot 43, and, hence, to move the head 38 downwardly within the guide 39. Downward movement of the head 38 moves the lever 37 generally downwardly, and provides a component that causes the carriage to move horizontally to the right, as viewed in Fig. 1. The carriage may move to the right, as viewed in Fig. 1, until it engages an adjustable stop 47. The stop 47 is adjustable horizontally along one of the two opposite slots 34a, within which the sections 34 of the brackets 30 are operable during the reciprocating movements of the carriage.

The positioning of the stop toward or away from the front of the machine determines the length of the stroke of the carriage, which must be correlated to the length of the copy sheets being employed. Hence, if a copy sheet twelve inches in length is being employed, the stop 47 will be positioned nearer the front of the machine than in instances where longer copy sheets are being used. The carriage 28 may, of course, be moved to the right of the machine by hand operation, if desired, although operation by means of the foot pedal and associated mechanism above described is preferred, since such leaves the hands of the operator free for introducing and removing copy sheets from the carriage.

Within the casing 10 there is provided a pair of guide tubes 49, within which counterweights 50 are supported by means of cables 51, which are guided by rolls 52 and 53, and are attached to the respective members 34. The counterweights 50 are elevated when the carriage moves to the right, as viewed in Fig. 1, and serve to return the carriage to the left upon completion of the copying or right-hand stroke of the carriage.

Within the carriage casing 31 is a platen roll support comprising a pair of swingable brackets 54. The brackets are shown as being integrally connected by a transverse member 55 and as being pivotally mounted upon a shaft 56, the ends of which are secured to the brackets 30.

The forward end portions of the brackets 54 support a platen roll 58, which is provided with projecting axle members 59 and 60 by means of which the roll is rotatably journalled in the members 54.

Figure 6:
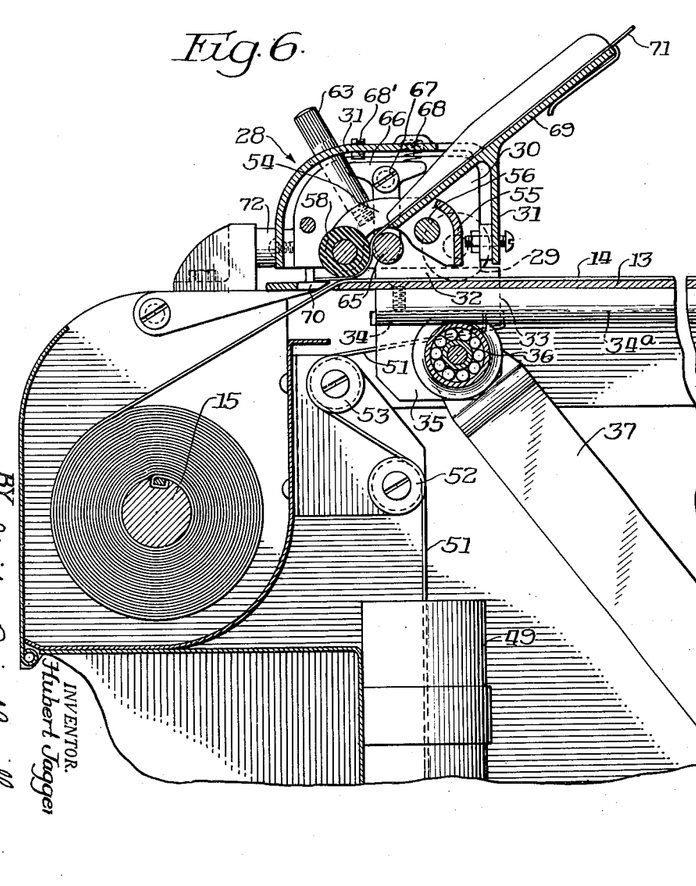
Fig. 6 is a broken sectional view taken on line 6—6 of Fig. 2.

The axle member 60 extends through an arcuate slot 61 (see Fig. 4) provided in the adjacent member 30, and at its outer end is provided with a roller 62. The arcuate slot 61 permits the roll 58 and the brackets 54 to swing arcuately about the axis of the shaft 56. The brackets 54 are provided, as shown in Fig. 6, with manually operable members 63, which extend through arcuate slots provided therefor in the casing or cover member 31 of the carriage 28, whereby the roll 58 may be manually lowered from a raised position or by means of which it may be elevated when desired.

Within the casing 31 is a second roll 65, which is journalled in depending brackets 66, each pivotally mounted as at 67, to an adjacent end plate or bracket 30. The upper ends of the brackets 66 are extended forwardly and rearwardly, as shown, and over the rear extensions thereof are provided springs 68 which tend to swing the roll 65 clockwise, as viewed in Fig. 6. The forward extensions of brackets 66 are adapted to abut adjustable stop screws 68', which limit such rearward swinging movement. The axial center of the roll 65 is slightly higher than the axial center of roll 58, and the adjustment of the screws 68' preferably is such that when the roll 58 is in lowermost position, as shown in Fig. 6, the pressure of roll 65 against the roll 58 tends to retain the latter in the lowermost position. Swinging the roll 58 in a clockwise direction, as viewed in Fig. 6, or to the position shown in Fig. 7, spaces said rolls 58 and 65 apart as viewed in said Fig. 7.

When the roll 58 is in the position shown in the latter figure, a copy sheet may be slid down a paper guide 69, which is shown as being formed as part of the carriage casing, which guide will direct the sheet over roll 65 and beneath the elevated roll 58 and into contact with a margin bar 70. Reverse movement of the roll 58, i. e., from the position shown in Fig. 7 to the position shown in Fig. 6, presses the adjacent end of the copy sheet, indicated by numeral 71, into contact with the duplicator band 14. As stated above, when the roll 58 is in the lower position, the roll 65 tends to retain the roll in such position, and, hence if the carriage is now moved forwardly, or to the right, as viewed in Fig. 6, the copy sheet 71 will be pressed progressively into contact with the surface of the duplicating band 14. The printing or copying movement of the carriage 28 may be effected, as described above, by downward pressure upon the pedal 48. Such movement of the carriage is arrested upon contact with the stop member 47, which stop member is adjusted for arresting the movement of the carriage in a position preferably wherein the upper or trailing end of a copy sheet 71 will still protrude above the rolls 58 and 65, between which rolls the end of the sheet is firmly gripped. Upon the termination of the copying movement of the carriage, as mentioned, the counterweights 50 move the carriage rearwardly, or to the left, as viewed in Fig. 6. Such movement to the left causes the roll 58 to rotate counter-clockwise, as viewed in Fig. 8, and by reason of the pressure of the rolls 58 and 65 against the interposed sheet, such movement of the carriage to the left, plus the rotating effect of roll 58, strips the copy sheet from the band 14. Thus each copy sheet, after having been pressed upon the band upon the movement of the carriage to the right, is stripped from the band by the movement of the carriage to the left. The sheets thus tend to slide out along the paper guide 69, upon movements of the carriage to the left although such stripping action is facilitated by engagement of the upper end thereof by the hand of the user. Thus, by the feeding of sheets into the carriage while the same is in the position shown in Fig. 7, and depressing the rolls 58 into the position shown in Fig. 6, and thereafter actuating the carriage by depression of the pedal 48, copies are made, while reverse movement of the carriage releases the copies from the band. The movement of the carriage to the left is arrested by cushion bumpers 72 secured to the casing 10.

Figure 7:
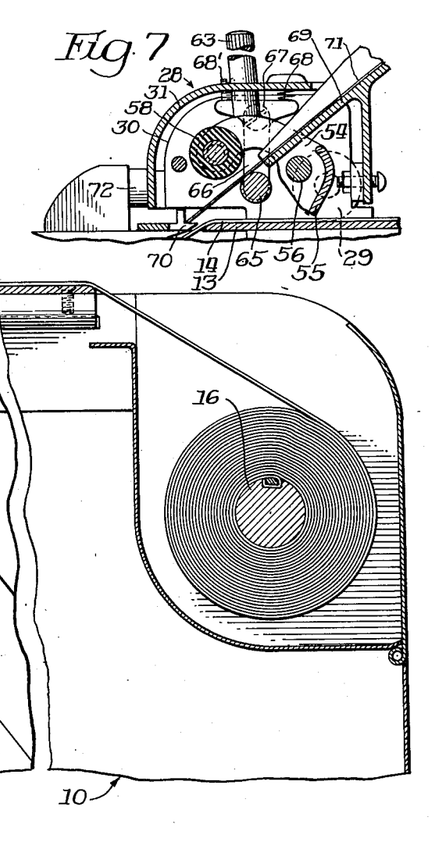
Fig. 7 is a sectional view through the carriage, corresponding to the representation thereof shown in Fig. 6, but showing the platen or sheet-laying roll in a different operative position.
Figure 8:
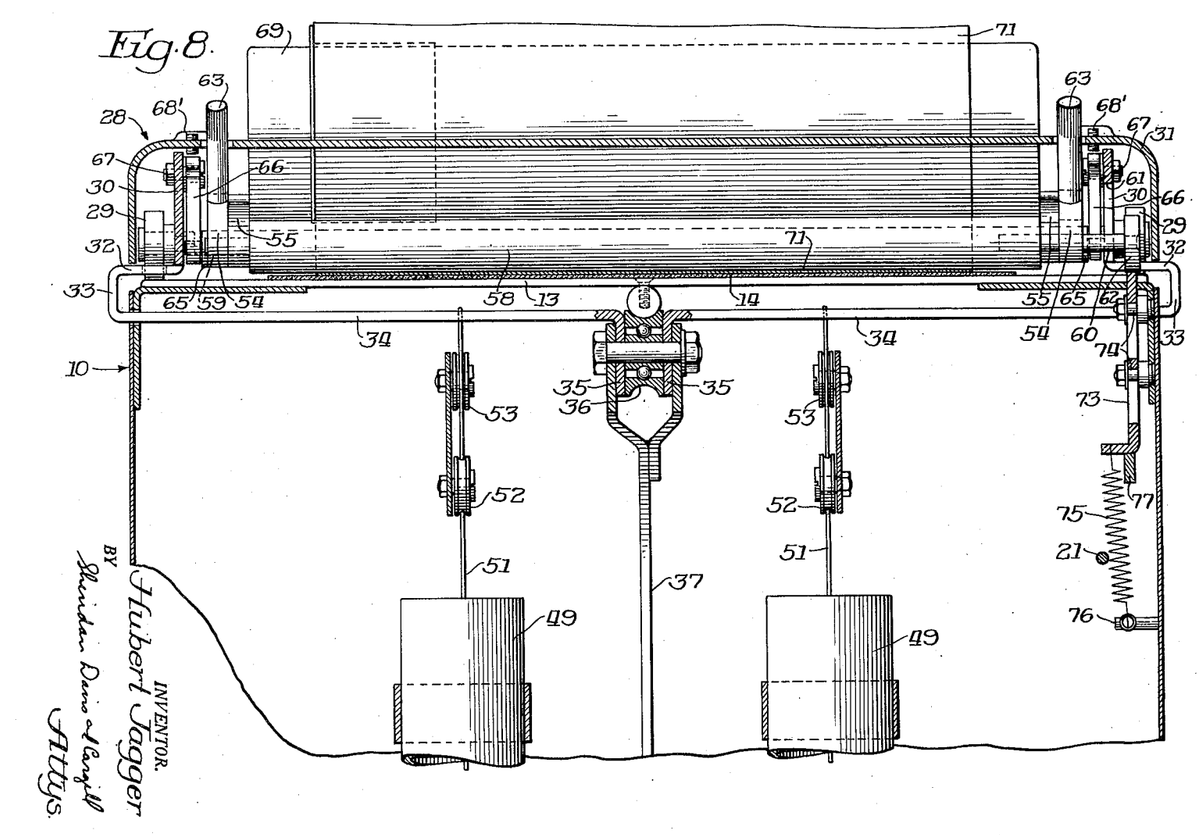
Fig. 8 is a vertical sectional view taken on line 8—8 of Fig. 4.
Figure 9:
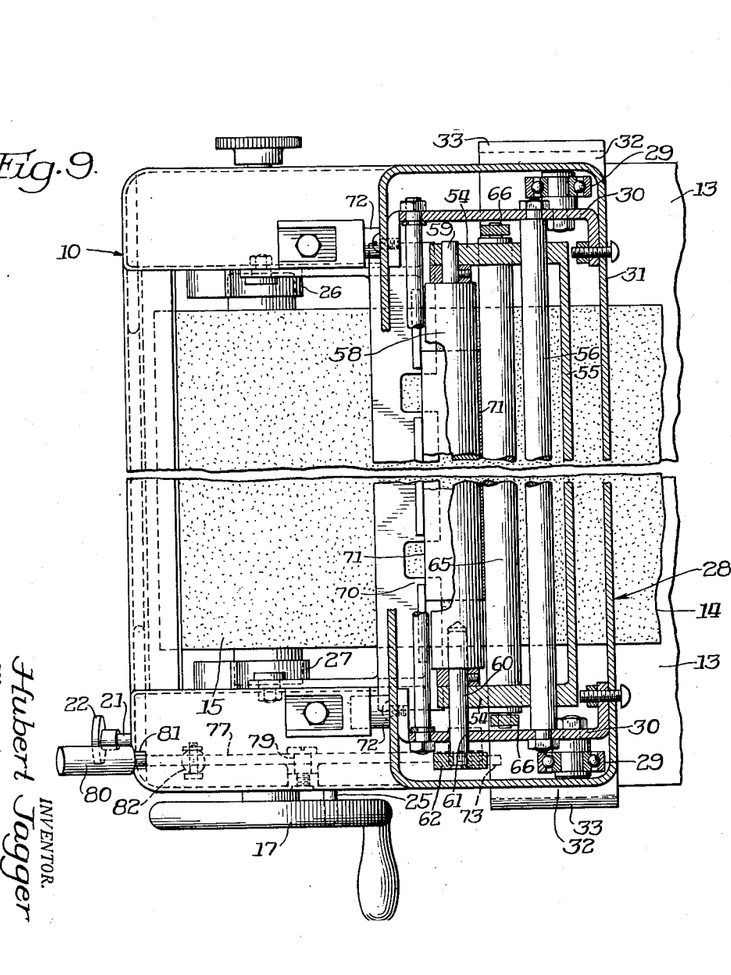
Fig. 9 is a horizontal sectional view taken on line 9—9 of Fig. 4.

Located within the casing of the machine is a vertically slidable elevator member 73 which is guided by pins 74 extending into slots provided in the member 73. A spring 75 is secured at one end to the lower end of the member 73 and at the other end is secured to a stud 76, and tends to retain the member 73 in lowermost position, as shown in Fig. 4. The upper end of the member 73 is in vertical alignment with the roller 62 when the carriage is in the position shown in Fig. 4 and is designed for upward movement for elevating the roll 58. Means for moving the member 73 upwardly against the action of spring 75 may comprise a lever 77 which is pivoted at 79 to the casing 10 and is provided with a handle 80 projecting from the adjacent end of the casing 10. The lever 77 operates within a slot 81, provided in the forward wall of the casing 10. Downward pressure of the handle 80 effects elevation of the slide member 73, and, hence, elevation of the roll 58. After elevation of the roll 58, as from the position shown in Fig. 6 to the position shown in Fig. 7, and release of the handle 80, the spring 75 restores the slide member 73 to the position shown in Fig. 4, leaving the roll 58 in the elevated position, as shown in Fig. 7. The roll 58 can thus be elevated by depressing handle 80 only when the carriage is in the rearward position shown in Fig. 6, although it may be elevated, in any position along the bed by means of the handles 63 or either of them.

For the purpose of facilitating the elevation of the roll 58 from copying position to the position shown in Fig. 7, foot-operable mechanism is provided. Such mechanism comprises a link 82 attached to the lever 77, and terminating at its lower end in a pedal or footpiece 83, which is conveniently located for operation by an operator standing or sitting at the front of the machine. Utilization of the pedal 83 leaves the hands of the operator free, one for withdrawing a sheet from the carriage, and another for inserting a fresh sheet into the carriage prior to the next copying stroke of the carriage, which, as above described, is effected by downward pressure of the pedal 48.

Figure 11:
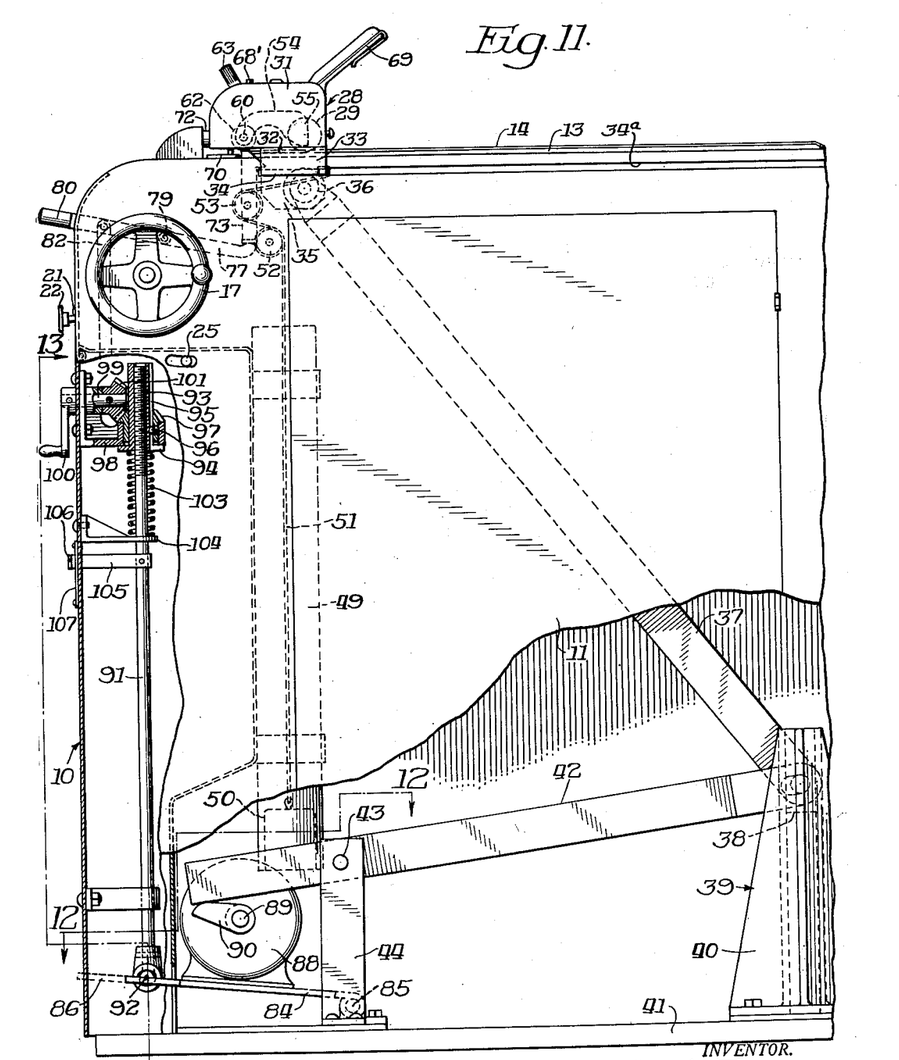
Fig. 11 is a broken side elevation of a modified form of the duplicating machine arranged for power operation.
Figures 12, 13:
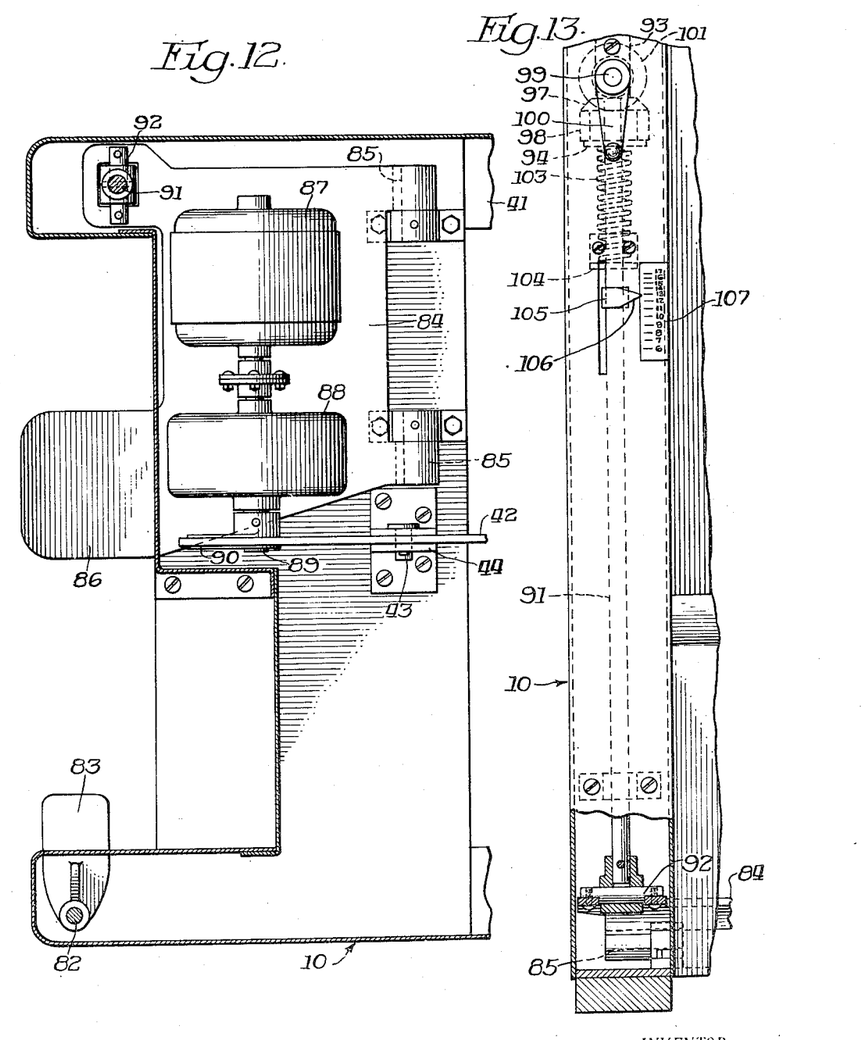
Fig. 12 is a horizontal sectional view taken on line 12—12 of Fig. 11.
Fig. 13 is a broken elevation, partly in section, as viewed along the line 13—13 of Fig. 11.

The modified structure shown in Figs. 11, 12, and 13 differs from that above described by the utilization of power means for effecting the working stroke of the machine. As shown in Fig. 11, the mechanism employs a link or arm 37 and lever 42 and associated mechanism similar to the above described form.

The foot operable lever 45 of the above form, however, is eliminated and there is substituted therefor a support member 84 which is pivoted at 85, and which preferably terminates at its forward end in a pedal 86, whereby the member 84 may be pressed downwardly by the foot of the operator, when desired.

As shown in Fig. 12, there is mounted on the swingable support, or platform 84, an electric motor 87 which is drivingly connected to a speed-reducing member 88 of conventional construction. The shaft 89 of the speed-reducer carries an actuator arm 90, disposed beneath and in the vertical plane of the forward end of the lever 42. As viewed in Fig. 11, it will be seen that rotation of the arm 90 in a clockwise direction will effect rocking movement of the lever 42, and as described previously, such movement of lever 42 will effect the movement of the carriage 30 to the right. The length of the stroke of the carriage is determined by the angular position of the support 84 or the vertical position of the shaft 89 and, hence, if the pedal 86 is pressed downwardly from the position shown in Fig. 11, the extent of pivotal movement imparted by arm 90 to the lever 42 will be reduced and thus a shorter horizontal movement will be imparted to the carriage 30.

Pressing the pedal 86 down to the maximum extent will lower the arm 90 out of operative contact with lever 42, and, hence, interrupt the operation of the machine. The use of pedal 86 may be resorted to for momentarily interrupting the driving action of the machine without shutting off the power to the motor.

For the purpose of effecting a precise adjustment of the angular position of member 84 for effecting a predetermined length of stroke of the carriage 30, a rod 91 is shown pivotally connected to the member 84 at 92. The upper end of the rod 91 is threadedly received within an internally threaded sleeve 93, having an outwardly turned flange 94 at its lower end. The sleeve 93 is provided with a longitudinal keyway 95 at its outer surface, within which is seated a key 96 carried by a gear 97, which is rotatably supported by a bracket 98 which, in turn, is secured for support to the front wall of the casing 10. The bracket 98 also supports a shaft 99, provided at its outer end with a crank 100 and at its inner end with a pinion 101, which meshes with the gear 97. Rotation of the crank 100 rotates the gear 101 and, in turn, rotates also the gear 97, which, by reason of the keyed connection thereof with the sleeve 93, effects rotation of the sleeve and thereby relative movement of the sleeve upon the threaded end of the shaft 91. Such rotary movement of the sleeve adjusts it vertically upwardly or downwardly along the shaft and thereby elevates or lowers the outer end of the pivoted support 84 and thus raises or lowers the arm 90 with reference to the adjacent end of the lever 42 for varying the effective length of the arm with respect to the rocking movement imparted thereby to the lever 42.

A spring 103 is shown disposed between the flange 94 of the sleeve 93 and a stationary spring support 104. The spring under compression, thus supports the sleeve 93 against downward movement from the position shown in Fig. 11, and, hence, during rotation of the sleeve upon operation of the crank 100, the shaft 91 is moved downwardly or upwardly, depending upon the direction of the operation of the crank.

It will be seen that the crank 100 constitutes a convenient means at the front of the machine for adjusting the effective throw of lever 90, and, hence, for selecting the length of the operating stroke of the carriage.

An indicator 105 is shown in Fig. 11 secured to the rod 91 projecting through a slot in the front wall of the casing 10 and terminating in a pointer 106. The pointer or indicator is slidable vertically along a plate 107 adjacent the slot and which may bear graduations for indicating to the operator various positions of adjustment of the member 84 for providing the length of the working stroke of the carriage required. The stroke of the carriage should, of course, be correlated with respect to the length of the copy sheets being used.

In the form of invention shown in Figs. 11, 12 and 13 the platen roller may be elevated to the position shown in Fig. 7, either manually, by operating the lever 80, or by depression of a pedal 83, as in the above described modification of the invention.

The structure above described not only provides a foot-operable or a power-operable duplicating mechanism but the mechanism performs certain desirable functions during use, most of which will be obvious from an examination of the drawings. However, it is pointed out that when a copy sheet 71 has been fed into the carriage while the platen roll 58 is in the elevated position shown in Fig. 7, the sheet is not withdrawn from the margin bar 70 when the roll 58 is lowered to the operative position shown in Fig. 6. Since the pivotal axis 56 about which the roll 58 swings is located rearwardly of the pressure roll 65, roll 58 in being lowered from the position of Fig. 7 to the position of Fig. 6, tends to effect rotation of roll 65 in a counter-clockwise direction as viewed in Fig. 6 which movement tends to feed the sheet 71 forwardly to compensate for the retractive action effected by roll 58 upon the sheet as the latter moves to the lowermost position. It will thus be apparent that the two rolls 58 and 65 cooperate not only for retaining the roll 58 in operative lowered position and in stripping sheets from the duplicator element during the rearward stroke of the carriage but they cooperate also, as described above, in retaining the lowermost edge of the copy sheets in the intended margin-determining position as the roll 58 is moved into the lowered position from the position shown in Fig. 7.

The location of the pivotal member 56 near the rear of the carriage casing 31 avoids obstructing visibility of the margin bar which is adjacent the forward end of the casing when the carriage is in the position shown in Fig. 6. This arrangement contributes to uniformity in placement of the duplicated matter upon the sheets. The carriage casing preferably is moulded of a light weight plastic material, including the sheet guide 69 and may have a window or sight opening at the forward end to render the margin bar clearly visible as the copy sheets are inserted. Transparent plastic may be employed for the carriage casing if desired.

While I have shown and described a structure that is illustrative of the invention, various changes in details thereof may be resorted to without departure from the spirit of the invention.

I claim:

1. In a duplicating machine, a horizontally disposed flat bed for supporting a duplicator element, a carriage reciprocable forwardly and rearwardly along said bed over said element and comprising means for pressing copy sheets into copying contact with said element, means biasing said carriage for movement in one direction along said bed, a vertical guide beneath said bed, a vertically reciprocable head operable along said guide, a link operatively connecting said carriage and head, a pivoted lever having an actuatable arm at one side of the pivot and an operating arm at the other side of the pivot, said latter arm being connected to said head for operating the same in one direction along said guide for effecting movement of said carriage in a direction in opposition to said biasing means, and means for operating said actuatable arm of said lever.

2. In a duplicating machine, a horizontally disposed flat bed for supporting a duplicator element, a carriage reciprocable forwardly and rearwardly along said bed over said element and comprising means for pressing copy sheets into copying contact with said element, means biasing said carriage for movement in one direction along said bed, a vertical guide located beneath said bed and forwardly of the carriage when the latter is in the position at which the same is moved by said biasing means, a head reciprocable along said guide, a link pivotally connected at the lower end to said head and extending upwardly and rearwardly into pivotal connection with said carriage, and means for moving said head downwardly for moving said link in directions to move said carriage horizontally along said bed in opposition to said biasing means.

3. In a duplicating machine, a horizontally disposed bed for supporting a duplicator element, a carriage mounted over said bed for reciprocation longitudinally thereof forwardly and rearwardly and provided with means for pressing copy sheets into contact with said element, biasing means acting on said carriage for moving the same in one direction to a given position, a vertically reciprocable member located beneath said carriage and forwardly thereof when in said given position, an inclined link pivotally connected to said carriage and to said head, a lever pivotally connected to said head for moving the same vertically in a direction to cause said link to impart horizontal movement to said carriage from said given position, and means for actuating said lever.

4. In a duplicating machine, a horizontally disposed bed for supporting a duplicator element, a carriage mounted over said bed for reciprocation longitudinally thereof forwardly and rearwardly and provided with means for pressing copy sheets into contact with said element, biasing means acting on said carriage for moving the same in one direction to a given position, a vertically reciprocable head located beneath said carriage and forwardly thereof when in said given position, an inclined link pivotally connected to said carriage and to said head, a lever pivotally connected to said head for moving the same vertically in a direction to cause said link to impart horizontal movement to said carriage from said given position, and means comprising a foot operable member for actuating said lever.

5. In a duplicating machine comprising a supporting bed for a duplicator element, a carriage reciprocable over said bed, means carried by the carriage for pressing copy sheets into copying contact with a duplicator element on said bed, a rocking lever beneath said bed operatively connected to said carriage and operable for effecting movement of the carriage along the bed in one direction, a motor provided with a rotating arm adapted to engage said lever for rocking the same, and adjustable means for the motor for shifting the same in directions for varying the range of rocking movement imparted to said lever by said arm for varying the length of stroke of the carriage.

6. In a duplicating machine comprising a bed for supporting a duplicator element, a carriage reciprocable along said bed, cooperating rotatable members carried by the carriage for laying copy sheets into copying contact with the element upon movement of the carriage in one direction and for stripping copy sheets from said element upon movement of the carriage in the opposite direction, power means comprising a rotating arm engageable with said lever through an arcuate portion of each rotation thereof for actuating said carriage in said first mentioned direction, energy storing means operatively connected to said carriage and energizable upon the movement of the carriage in said first mentioned direction for effecting movement of said carriage in the opposite direction and manually operable means for adjusting the position of said power means relative to said lever for effecting a selected variation in the length of movement of the stroke of said carriage.

7. In a flat bed type duplicator, a supporting structure provided with a bed for a duplicating element, a carriage operable over said element for pressing copy sheets into copying relation with respect thereto, a link pivotally connected at one end to said carriage beneath said bed, a reciprocable head pivotally connected to the opposite end of said link, means constraining said head for movement in a vertical direction for effecting movement of said carriage over said element from a position adjacent one end of the bed, and means for effecting movement of said head in said direction through selected ranges for controlling the ranges of movement of said carriage over said element.

HUBERT JAGGER.

REFERENCES CITED

The following references are of record in the file of this patent:

UNITED STATES PATENTS

| Number | Name | Date |
| --- | --- | --- |
| 1,019,312 | Flanigan | Mar. 5, 1912 |
| 1,118,119 | Flanigan | Nov. 24, 1914 |
| 1,717,864 | Williams | June 18, 1929 |
| 1,746,642 | Flanigan | Feb. 11, 1930 |
| 1,767,577 | Buchanan et al. | June 24, 1930 |
| 1,967,694 | Weide | July 24, 1934 |

FOREIGN PATENTS

| Number | Country | Date |
| --- | --- | --- |
| 524,190 | Germany | May 4, 1931 |